(12) United States Patent
Unvericht et al.

(10) Patent No.: US 10,160,187 B2
(45) Date of Patent: Dec. 25, 2018

(54) MULTILAYER PANEL

(71) Applicant: RENOLIT SE, Worms (DE)

(72) Inventors: Reinhard Unvericht, Lorsch (DE);
Adriano Odino, Angrogna (IT);
Massimiliano Fogliati, Turin (IT)

(*) Notice: Subject to any disclaimer, the term of this patent is extended or adjusted under 35 U.S.C. 154(b) by 0 days.

(21) Appl. No.: 14/901,823

(22) PCT Filed: Jun. 26, 2014

(86) PCT No.: PCT/EP2014/063574
§ 371 (c)(1),
(2) Date: Dec. 29, 2015

(87) PCT Pub. No.: WO2015/000793
PCT Pub. Date: Jan. 8, 2015

(65) Prior Publication Data
US 2016/0152015 A1    Jun. 2, 2016

(30) Foreign Application Priority Data

Jul. 4, 2013  (IT) .............................. GE2013A0064

(51) Int. Cl.
*B32B 27/30* (2006.01)
*B32B 27/32* (2006.01)
(Continued)

(52) U.S. Cl.
CPC ................ *B32B 27/12* (2013.01); *B32B 7/12* (2013.01); *B32B 27/20* (2013.01); *B32B 27/304* (2013.01); *B32B 27/32* (2013.01); *B32B 27/36* (2013.01); *E04C 2/24* (2013.01); *E04C 2/28* (2013.01); *E04C 2/34* (2013.01); *E04C 2/46* (2013.01); *E04C 2/50* (2013.01);
(Continued)

(58) Field of Classification Search
CPC ... B32B 27/32; B32B 27/36; B32B 2307/412; B32B 2419/04; B32B 2471/00; B32B 2607/00; B32B 7/12; B32B 27/12; B32B 27/20; B32B 27/304; Y10T 428/24124; Y10T 428/249929; Y10T 428/24994; Y10T 428/249991; Y10T 428/249992; E04F 15/105; E04F 15/107; E04F 15/10; E04F 15/102
See application file for complete search history.

(56) References Cited

U.S. PATENT DOCUMENTS 5,059,474 A * 10/1991 Yoshida .................. B32B 27/08
                                                                         428/174
6,468,643 B1 * 10/2002 Kanbayashi .......... B29C 70/202
                                                                         349/73
(Continued)

FOREIGN PATENT DOCUMENTS

WO  WO 2004050355 A1 *  6/2004  ............. B32B 27/08
WO  WO 2011113959 A2 *  9/2011  ............. B29C 44/32
WO  WO 2012004701 A3 * 11/2012  ............. B32B 21/08

*Primary Examiner* — Catherine A. Simone
(74) *Attorney, Agent, or Firm* — Themis Law

(57) ABSTRACT

A composite multilayer panel includes a core having at least one layer made of a polyolefin or polyester or PVC based material filled with fibers and/or fillers and/or particles, the core being provided at least on one side with a wear resistant covering layer, which is coupled to the core by lamination, the panel being made of a moisture resistant composite thermoplastic material.

16 Claims, 3 Drawing Sheets

(51) Int. Cl.
  *B32B 27/36* (2006.01)
  *B32B 7/12* (2006.01)
  *B32B 27/12* (2006.01)
  *B32B 27/20* (2006.01)
  *E04C 2/24* (2006.01)
  *E04C 2/28* (2006.01)
  *E04C 2/34* (2006.01)
  *E04B 2/00* (2006.01)
  *E04B 5/02* (2006.01)

(52) U.S. Cl.
  CPC ..... *B32B 2307/412* (2013.01); *B32B 2307/73* (2013.01); *B32B 2367/00* (2013.01); *B32B 2419/04* (2013.01)

(56) References Cited

U.S. PATENT DOCUMENTS

| | | | |
|---|---|---|---|
| 8,474,208 B2* | 7/2013 | Ruland | C08L 97/007 428/195.1 |
| 2003/0194540 A1 | 10/2003 | Fusco | |
| 2003/0215618 A1* | 11/2003 | Hynicka | B32B 27/12 428/196 |
| 2006/0032175 A1* | 2/2006 | Chen | B32B 3/04 52/578 |
| 2011/0151174 A1* | 6/2011 | Hainbach | B32B 3/02 428/78 |
| 2011/0300392 A1* | 12/2011 | Vermeulen | E04F 15/02 428/513 |
| 2012/0266555 A1* | 10/2012 | Cappelle | E04F 15/02038 52/309.1 |
| 2014/0109507 A1* | 4/2014 | Dossche | B32B 21/04 52/588.1 |

* cited by examiner

MULTILAYER PANEL

FIELD OF THE INVENTION

The invention relates to a multilayer panel.

Such panels can be used for example as wall panels or in flooring, ceiling or roofing.

BACKGROUND OF THE INVENTION

Panel known in the art for this use are for example those used in laminate flooring, wherein a core or carrier board is provided, preferably made of HDF or MDF, which is covered by a decorative layer and a covering layer.

Laminate flooring has many disadvantages, for example it does not provide for a smooth sound on walking. Recently introduced foam underlayment helps dampen this feeling, but not satisfactorily.

Another drawback of laminate flooring panels is that they lack water and moisture resistance. This can lead to deformation and deterioration of the panel, especially in moist environments or in outdoor applications.

DE4107151A1 of the applicant discloses a floor covering panel made of wood or chipboard, with a plastic film fixed to the upper surface with a layer of adhesive, and with jointing tongues or grooves at the sides; The plastic film is a multilayer film comprising an upper transparent layer based on polyolefin with little or no filler, a lower layer based on polyolefin and with inorganic fillers and/or pigments and a layer of adhesive.

This panel provides improved flexibility of the covering compared to thermoset coverings, and more warm feeling on walking but can not be exposed to humid conditions.

DE202004014160U1 describes a floor covering panel comprising a carrier plate consisting of a pressure resistant wood material, and a top layer incorporating a polymer foil and dampening layers made of cork either on the rear side of the carrier plate or between polymer foil and carrier.

While additionally focusing on sound insulation, also this panel has the drawback of lacking water and moisture resistance.

The above mentioned panels subsequently improve comfort issues of decorative panels but have some drawbacks since they do not allow for good anti-humidity performances.

Furthermore, the panels known in the art does not provide for a sufficient weight distribution, so that heavy objects that lean against a reduced area of the panel are likely to cause denting or local collapsing of the surface.

SUMMARY OF THE INVENTION

The invention aims at avoiding the drawbacks of prior art panels, with a composite multilayer panel, which has a core consisting by at least one layer made of a polyolefin or polyester or PVC based material filled with fibers and/or fillers and/or particles, which core is provided at least on one side with a wear resistant covering layer, which covering layer is coupled to said core by lamination, said panel being made of moisture resistant composite thermoplastic material.

Advantageously, the covering layer is applied on the core in the form of a sheet, and by lamination, directly on exit of the supporting layer from the extruder.

The core can comprise alternatively or in combination, for example, polyethylene, polypropylene or other polyolefins or polyolefin copolymers, as for example ethylene-vinyl acetate (EVA), or polyester as for example polyethylene terephthalate (PET) or other polyesters, or polyvinyl chloride (PVC).

The fibers can be natural fibers, as for example wood fibers, cellulose, or mineral fibers, as for example basalt fibers, or glass fibers or organic fibers like Polyamide or Polyester fibres.

Particles can be for example grinded wood, not completely broken down to fibers.

Fillers can be inorganic materials like chalk or talcum.

The fibers and/or particles and/or fillers are mixed to the thermoplastic matrix in a random manner prior to creation of a board, which constitutes the core.

The panel is therefore not transparent or translucent.

The layers constituting the multilayer panel are advantageously laminated all together, and the adhesion is made mechanically, comprising for example glueing, and/or by chemical compatibility.

In a preferred embodiment the panel is suitable for flooring or wall panels. It can be used in indoor applications, like for example house floor, ceiling, caravan floor, wall panels of damp rooms, as for example basements, or outdoor applications, as for example for façade panels, roofs, external walls panels.

The panel is soundproofing and confers to the floor a "warm" sound, even though it keeps a high mechanical resistance, so that denting or local collapsing of the surface of the panel is avoided.

Furthermore, the panel has a very good anti-humidity resistance, since it is composite.

Advantageously, the moisture resistance of the panel is not only guaranteed from the agents acting on the surface of the covering layer, but also from those acting on the lateral surfaces of the panel and from the backside of the panel.

The panel has a behavior in response to thermal cycles that is similar to the wood, so that it can be coupled to wood or wood-based panels, avoiding at the same time any problems of distortion and/or thermal expansion.

Another great advantage of the panel is its light weight.

The panel is also easily recyclable.

In an exemplary embodiment the covering layer has a sufficient chemical compatibility with the core so that the coupling of the covering layer to the core is made by thermal heating.

The core and the covering layer are properly heated so that during lamination the chemical compatibility allows the creation of a strong bond.

In an alternative embodiment the coupling of the covering layer to the core is made by hot melt or similar adhesives.

Hot melt can be either thermoplastic adhesives like EVA-TPU or PO-based Grades or reactive Hotmelts like e.g. crosslinking PUR-Hotmelts, which allow for a strong adhesion.

Another advantage is due to they fluidity, that allows for low operative injection pressures.

In a further exemplary embodiment said covering layer comprises a decorative layer.

The decorative layer can be printed or formed as to confer the desired appearance to the whole panel, for example to create a wood board surface appearance.

Flame retardant can be added to fulfill requirements with respect to different standards.

Preferably, said decorative layer is not made of paper.

In an exemplary embodiment said covering layer is transparent.

In this case the external aesthetic appearance of the panel is that of the surface of the core itself.

In a preferred exemplary embodiment said covering layer is made of a PET (polyethylene terephthalate) based formulation, which can comprise PET and its copolyesters, as well as impact modifiers and other polymers.

In further embodiments, said covering layer can be made of PVDF (polyvinylidene fluoride) and/or ASA (acrylonitrile-styrene-acrylate) and/or ABS (acrylnitril-butadiene-styrene) and/or PC (polycarbonate) and/or Polyamide and/or metal film and/or polyolefin and/or polyolefin copolymers and/or PVC and/or acrylic. In an exemplary embodiment an outer abrasion resistant protective layer is provided.

In an exemplary embodiment a fiber layer is provided between said core and said covering layer.

In an exemplary embodiment said core is composed by two or more overlaid boards made of polyolefin or polyester based material filled with fibers.

The two or more overlaid boards can be coupled one with the other and/or with the other layers preferably by means of glue or thermolamination.

In an improvement a shrinking limitation grid being provided between said boards.

In a further improvement, the fibers of each board are oriented, and the boards are arranged one with respect to the other so that the fibers are oriented crosswise.

The fibers can be oriented in directions perpendicular to each other, or just crossed and shifted by a predetermined angle.

This improves the strength of the panel and allows for a flexural strength that is not orientation-dependent.

Between said boards a grid or net of glass fibers and/or plastic fibers can be inserted. Said plastic fibers can comprise for example polyolefin or polyester fibers.

Such grid or net can assure a good dimensional stability of the panel, increasing stiffness and resistance to thermal dilatation.

In an exemplary embodiment said polyolefin based material comprises anti-flame additives and/or compatibility additives.

The addition of anti-flame additives can improve the resistance of the panel to the fire and improve the safety of the panel.

The addition of compatibility additives can promote the adhesion the polyolefin material of the core and the fiber, and also the adhesion of the layers to each others during lamination.

In an exemplary embodiment said core is constituted by a single layer with a thickness comprised between 0.5 and 25 mm.

In an exemplary embodiment said thickness is comprised between 4 and 25 mm and said core is shaped by milling.

The structure and the composition of the panel allows for a refined shaping by milling, so that precise joint between adjacent panels can be easily obtained, avoiding distortion and deformation as in the known panels.

In an exemplary embodiment said core is coupled to one or more stabilization layers.

Said stabilization layers provide balance to the external forces applied on the covering layer, and improve the strength of the panel.

In an improvement said one or more stabilization layers are made of moisture resistant materials and/or cardboard honeycomb, made with resin impregnated papers and/or plastic honeycomb and/or aluminium and/or thermoplastic materials and/or highly filled PE.

In particular, the plastic honeycomb allows for a good structural resistance, while it reduces drastically the weight of the panel.

A stabilization layer can comprise for example also PVC.

In an exemplary embodiment said core is coupled to said one or more stabilization layers by gluing.

In an improvement said gluing comprises a fiber layer laid between said core and said one or more stabilization layers.

In a further improvement said fiber layer is made of natural, plastic, synthetic or mineral fibers, and preferably comprises polyester and/or viscose.

Preferably the fiber layer is a non woven layer. In this case, the fiber layer absorbs the glue so that the panel is stably fixed to the stabilization layer and/or on the floor or on a wall. The glue can be treatable with water or solvents or can be for example a reactive polyurethane glue.

As an alternative, or preferably in combination, a plastic film, such as a poliolefinic film, is provided with a primer on a side.

In fact, the panel itself can absorb a fraction of water or moisture in presence of hydrophilic fillers, particles or fibers. In certain particular situations, it could be required that the material undergoes the least possible deformation, for example during variation of temperature. This means that the coefficient of thermal expansion should be reduced, which in turn could be related to the presence or absence of moisture, which influences the expansion.

A solution to this problem is to put on the back of the panel the plastic layer with the primer, which efficiently blocks the moisture. However, the plastic material, especially polyolefin, is not easily coupled to the glue. The primer provided on the side facing the glue facilitates bonding. The plastic material is fixed by lamination to the boards or to the rest of the panel, and blocks the moisture, and the primer on the other side is coupled to the glue.

In combination or as a further alternative, the fiber layer comprises paper and/or net.

In an exemplary embodiment the total thickness of the panel is comprised between 2 and 50 mm.

In an exemplary embodiment the panel is coupled to one or more functional layers.

In an improvement said one or more functional layers are made of plastic foams, like for example foamed PP and/or foamed PE, and/or cork and/or a mixture of cork and soft plastic material.

Said soft plastic material can be composed for example by EVA and/or polyolefine and/or rubber and/or APP-compounds.

Such functional layer improves the light weight, water resistance and flexibility of the panel.

A functional layer can be for example be constituted by another heavy layer.

The functional layers are useful for acoustical insulation, damping or anti-humidity.

They are also useful during installation, since they can adapt to a lightly irregular surface to be covered and avoid therefore deformations of the panel or undesired noise.

In a further embodiment the panel is formed by means of an embossing device for example by one or more calendering rolls, double belt press or structured plates in a static press, so that the external surface of said covering layer has an embossed structure.

BRIEF DESCRIPTION OF THE DRAWINGS

The features of the invention and the advantages derived therefrom will appear more clearly from the following description of embodiments illustrated in the annexed drawings, wherein.

DETAILED DESCRIPTION OF EMBODIMENTS
OF THE INVENTION

Figure 1:
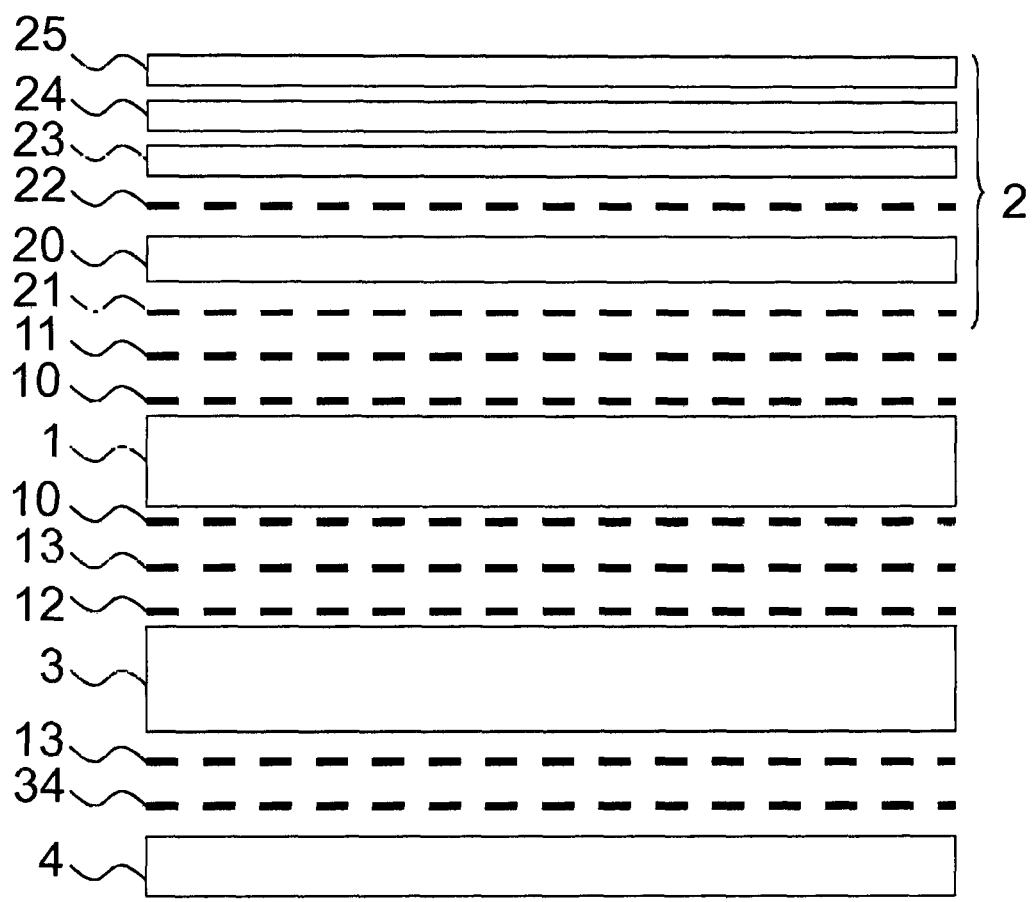
FIG. 1 shows a first embodiment of the panel.

In FIG. 1 it is shown a first embodiment of the composite multilayer panel according to the invention, specifically designed for flooring or wall panels.

The panel comprises a core 1 consisting of one layer made of a polyolefin or polyester based material filled with fibers and/or fillers and/or particles, which core is provided at least on one side, typically on the upper side, with a wear resistant covering layer 2, which covering layer is coupled to said core by lamination.

The core 1 can comprise polyethylene, polypropylene or other polyolefins. It can also comprise modified polyolefins or PO-copolymers or polyolefins, which can include EVA or crafted PE and/or PO.

The fibers can be natural fibers, as for example wood fibers, cellulose, or mineral fibers, as for example basalt fibers, or glass fibers, or organic fibers like polyamide or polyester fibers.

Fillers can be inorganic materials like chalk or talcum.

Particles can be grinded wood, not completely broken down to fibers.

The core 1 of the exemplary embodiment of FIG. 1 has a thickness of 1.1 mm.

Between said core 1 and said covering layer 2 a fiber layer 10 is provided, and a hot-melt layer 11 for gluing.

The fiber layer 10 is coupled to the core 1, and creates a clinging action for the hot-melt layer 11 and the covering layer 2.

The fiber layer 10 can be for example made of polyester and/or viscose and/or net.

Said covering layer consists of a multi-layer, preferably comprising PET, although other materials can be used, as for example PVDF, ASA, ABS, PC, metal film, PUR, PA, EVA, PO, Ionomer, PVC, Acrylic, grafted PO-copolymers, grafted PO.

In the exemplary embodiment shown in FIG. 1, the covering layer comprises a decorative layer 20, made of PET and with a thickness of 120 μm.

Said decorative layer 20 is provided on the side directed to the core 1 with a primer layer 21, and on the opposite side, which is visible from outside, with a printing layer 22.

The decorative layer 20 can be omitted or made transparent, if the wanted appearance of the whole panel is that of the core 1. In this case, printing, as described with layer 22, can be done directly on the core 1.

The printing layer 22 can reproduce the desired aesthetical appearance, as for example reproducing a wood section plane.

Upon said printing layer 22 are overlaid two wear resistant layers made of PET 23 and 24, which are transparent and have a thickness of 130 μm each.

The wear resistant layers 23 and 24 allow for resistance to heavy trampling and scratches.

The covering layer 2 comprises, on the top surface, a scratch resistant protective layer 25 for example based on 2 component PUR-coverings or UV-coverings, i.e. coverings crosslinked by high energy radiation like UV-light or electron beam.

On the opposite side of the core 1, with respect to said covering layer 2, a stabilization layer 3 is provided, which provides balance to the external forces applied on the covering layer 2, and improves the strength of the panel and can be made of MDF and/or resin impregnated cardboard honeycomb and/or plastic or metal based honeycomb and/or aluminium and/or thermoplastic materials and/or highly filled PE.

The stabilization layer 3 of the exemplary embodiment of FIG. 1 has a thickness comprised between 1 and 10 mm.

A further fiber layer 10 is coupled to the core 1 on the side directed to said stabilization layer 3, and a glue layer 12 is inserted therebetween, like for example a cross-linkable PUR-dispersion glue or a reactive PUR-Hotmelt.

A plastic film 13, such as a poliolefinic film, is provided with a primer on one side, and it is interposed between the fiber layer and the glue layer 12. The side provided with the primer is the side facing the glue layer 12.

The panel described so far can be further glued, by means of a further glue layer 34, to a functional layer 4 useful for acoustical insulation, damping or anti-humidity.

Also in this case, a plastic layer 13 with primer can be used to promote gluing. Also in this case the side provided with the primer is the side facing the glue layer 34.

The functional layer can be made of plastic foams like foamed PP and/or foamed PE and/or similar materials, or it can also be made of cork.

Figure 2:
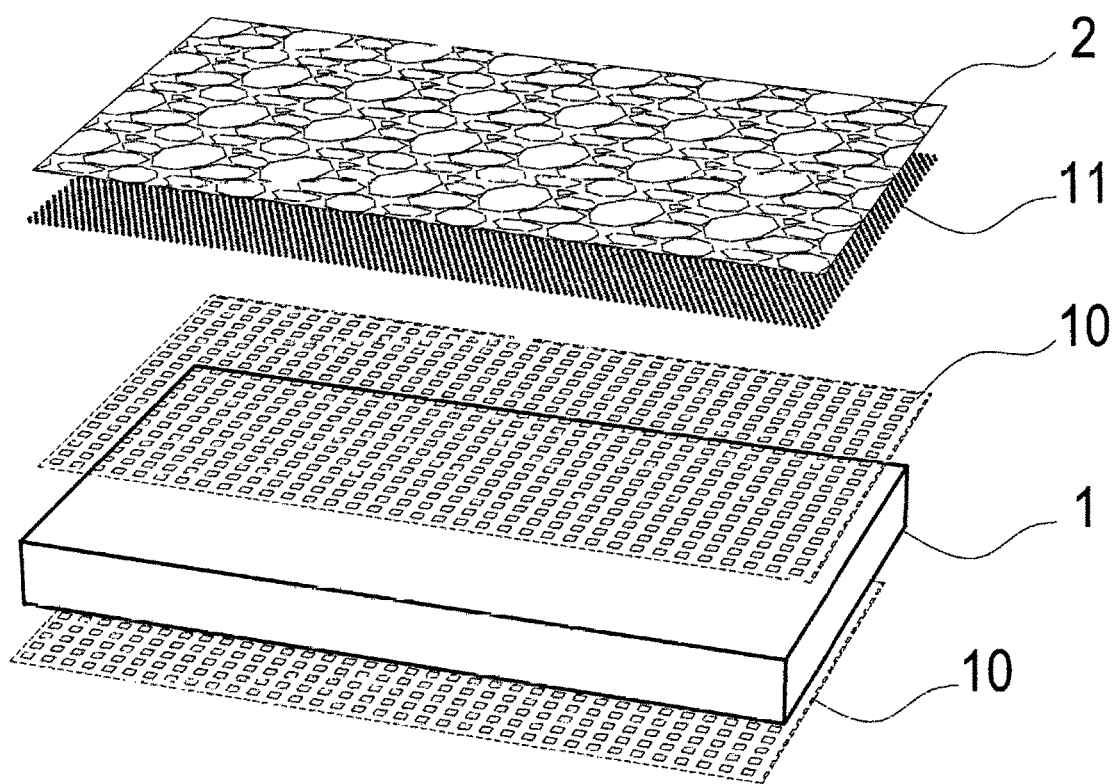
FIG. 2 shows a second embodiment of the panel.

FIG. 2 shows a more minimal embodiment of the panel, which comprises the core 1 made of polyolefin filled with fibers, coupled on each side with a fiber layer 10.

A covering layer 2 is provided on one side of the core 1, and a hot-melt layer 11 is provided between said core 1 and said covering layer 2, and the panel is formed by lamination.

Instead of hot-melt, it can be used another glue or another similar adhesive layer.

The core 1 is made of WPC (Wood Plastic Composite), it has flame retardant additives and it has a thickness of 4.5 mm.

Figure 3:
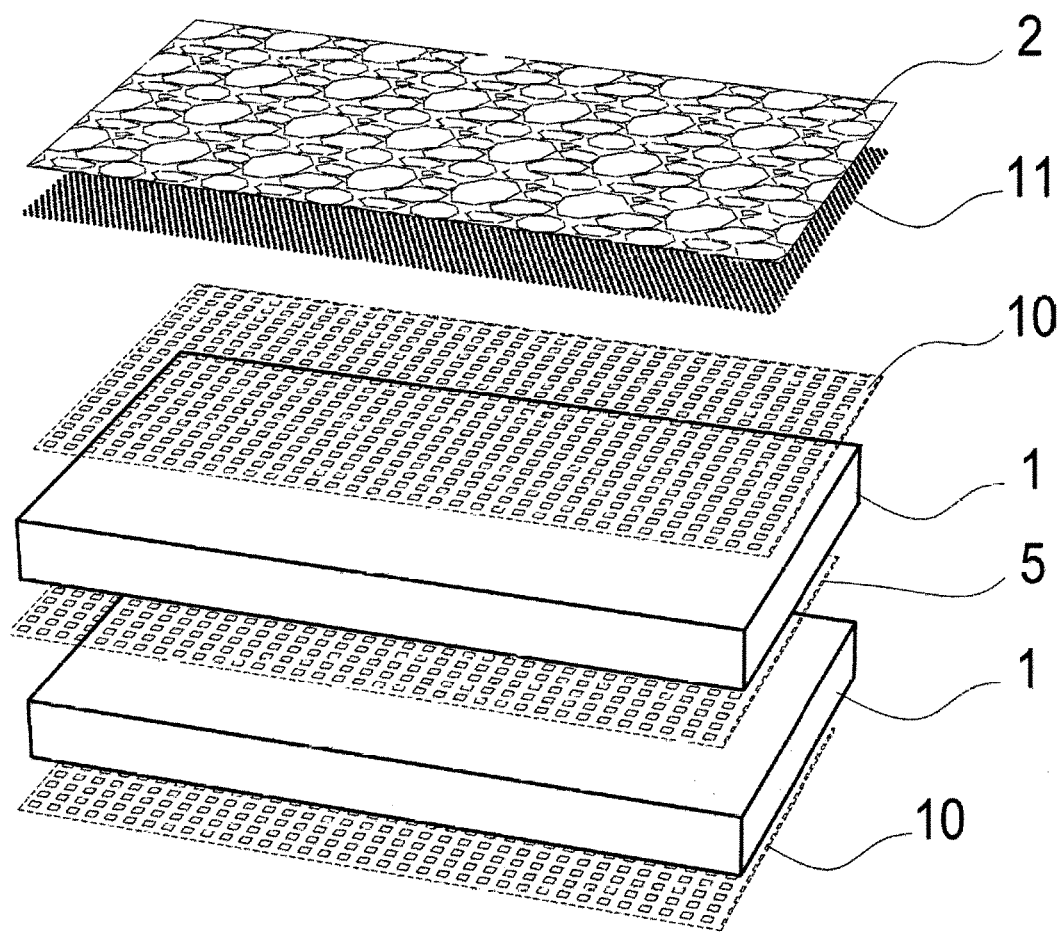
FIG. 3 shows a third embodiment of the panel.

FIG. 3 shows a panel wherein the core 1 is constituted by two boards, preferably two overlaid WPC boards made of polyolefin based material filled with wood fibers, and the fibers of each board are oriented, and the boards are arranged one with respect to the other so that the fibers are oriented crosswise.

Between said boards a shrinking limitation grid 5 is provided.

The two overlaid boards are then covered on each side by a fiber layer 10, and the upper side is coupled by a hot-melt layer 11 to a covering layer 2. The whole panel is formed by lamination, and can be glued to further structural and/or functional layers as described for example in FIG. 1.

The two boards of core 1 have a thickness of 1 mm each.

According to another embodiment, the lower board of core 1 is made by PE and/or EVA or other modified polyolefins highly filled, for example with mineral or natural fillers.

The invention claimed is:
1. A composite multilayer panel, comprising:
   a core (1) having at least one layer made of a polyolefin, polyester, or PVC based material filled with one or more of fibers, fillers, or particles;
   a wear resistant covering layer (2) coupled to an upper side of said core (1) by lamination, said panel being made of a moisture resistant composite thermoplastic material;
   a first fiber layer (10) disposed between said core (1) and said covering layer (2);
   a first adhesive layer interposed between said first fiber layer (10) and said covering layer (2), said first fiber layer being laid directly on said core, said first adhesive layer coupling said wear resistant layer to said core (1), wherein said first adhesive layer is a hot melt adhesive layer, and wherein said first fiber layer is a clinging layer for said hot melt adhesive; and one or more stabilization layers (3) made of one or more of aluminum, PVC, a thermoplastic material, a foamed material, or a plastic honeycomb, said one or more stabilization layers being coupled to a lower side of said core (1) and having a thickness between 1 and 10 mm wherein said core (1) is coupled to said one or more stabilization layers (3) by a second adhesive layer, and wherein a second fiber layer is interposed between said core (1) and said one or more stabilization layers (3), said second fiber layer being laid directly on said core, said second adhesive layer coupling said one or more stabilization layers to said core.

2. A panel as claimed in claim 1, wherein said covering layer (2) comprises a decorative layer (20).

3. A panel as claimed in claim 1, wherein said covering layer (2) is transparent.

4. A panel as claimed in claim 1, wherein said covering layer (2) is made of one or more of PET, PVDF, ASA, ABS, PC, a polyamide, a metal film, a polyolefin, a polyolefin copolymer, a PVC, or an acrylic resin.

5. A panel as claimed in claim 1, wherein said core (1) is a multilayer core having two or more overlaid boards made of polyolefin or polyester based material filled with fibers, a shrinking limitation grid (5) being provided between said boards.

6. A panel as claimed in claim 1, wherein said core (1) is a multilayer core having two or more overlaid boards made of a material comprising polyolefin or polyester filled with fibers, and wherein the fibers of each board are oriented, and the boards are arranged one with respect to the other so that the fibers are oriented parallel or crosswise.

7. A panel as claimed in claim 1, wherein said core (1) is consists essentially of a single layer with a thickness comprised between 0.5 and 25 mm.

8. A panel as claimed in claim 7, wherein said thickness is comprised between 4 and 25 mm and said core (1) is shaped by milling to form structures which allow linking said core to a core of another panel.

9. A panel as claimed in claim 1, wherein said second fiber layer is made of natural, synthetic or mineral fibers.

10. A panel as claimed in claim 1, wherein a total thickness of the panel is comprised between 2 and 50 mm.

11. A panel as claimed in claim 1, wherein said one or more stabilization layers are coupled to one or more functional layers (4), which are made of a mixture of cork and a soft plastic material.

12. A panel as claimed in claim 1, wherein the covering layer (2) comprises, on a top surface thereof, a transparent abrasion resistant protective layer (25).

13. A panel as claimed in claim 1, wherein said panel is formed with calendering rolls, such that an external surface of said covering layer (2) has an embossed structure.

14. A panel as claimed in claim 1, wherein said panel is formed by a press plate or structured belts in static or double belt presses, such that an external surface of said covering layer (2) has an embossed structure.

15. A panel as claimed in claim 1, wherein said panel is configured for flooring or indoor or outdoor wall panels.

16. A panels as claimed in claim 1, further comprising a plastic layer interposed between the second fiber layer and the second adhesive layer.

* * * * *